Jan. 27, 1970 J. C. GOETTELMANN 3,492,488

PHOTON COUPLING FOR A COMMUNICATION CIRCUIT

Filed Sept. 11, 1967 3 Sheets-Sheet 1

INVENTOR
J. C. GOETTELMANN
BY
Charles Scott Phelan
ATTORNEY

Jan. 27, 1970 J. C. GOETTELMANN 3,492,488
PHOTON COUPLING FOR A COMMUNICATION CIRCUIT
Filed Sept. 11, 1967 3 Sheets-Sheet 3
FIG. 4A
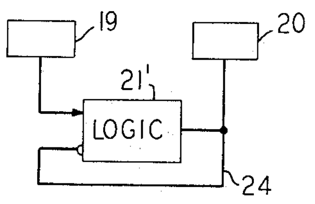
FIG. 5
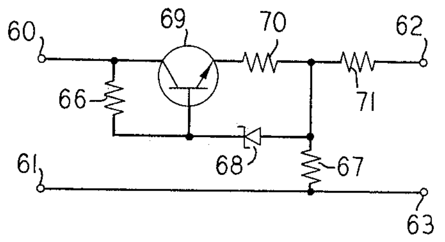
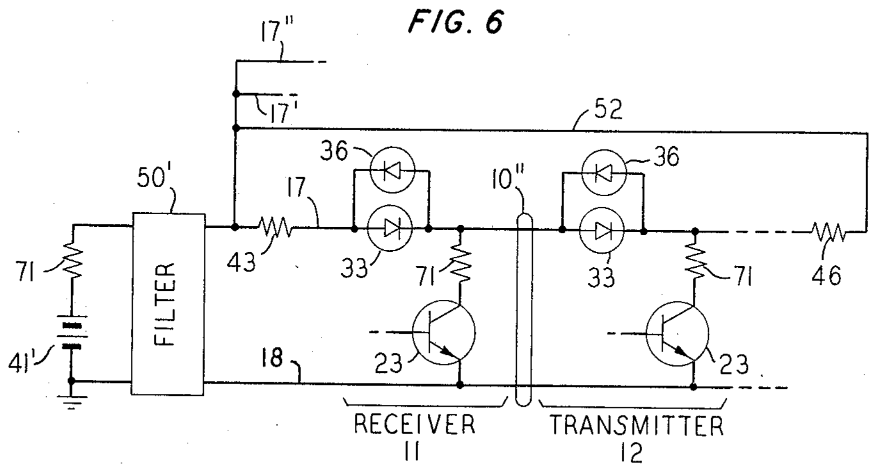
FIG. 7
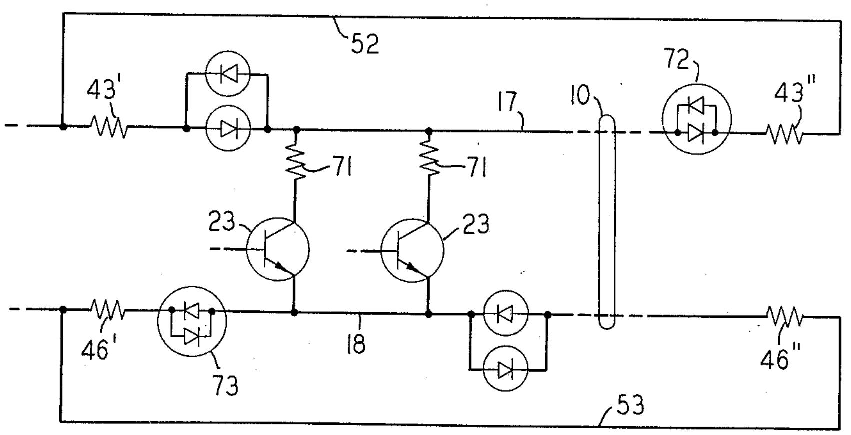

United States Patent Office 3,492,488

Patented Jan. 27, 1970

3,492,488

PHOTON COUPLING FOR A COMMUNICATION CIRCUIT

John C. Goettelmann, Aurora, Ill., assignor to Bell Telephone Laboratories Incorporated, Murray Hill, N.J., a corporation of New York Filed Sept. 11, 1967, Ser. No. 666,848
Int. Cl. H01j *39/12;* G02f *1/28*
U.S. Cl. 250—214 19 Claims

ABSTRACT OF THE DISCLOSURE

A transmitting circuit in one station coupled to a common communication bus completes a current path through the bus across a common current source for drawing current from the source in accordance with information to be transmitted. Photoemissive devices in series in the bus at each signal receiving station on the bus respond to the flow of current therethrough to provide photon coupling to their respective units in accordance with the information content of signals from the transmitting unit. Photon coupling is realized in this fashion in both balanced and unbalanced bus systems.

BACKGROUND OF THE INVENTION

Field of the invention

This invention relates to bus circuits for common utilization by a plurality of stations for communicating with one another. The invention relates in particular to such systems which employ photon coupling between a station and the bus system.

Description of the prior art

There are a number of advantages arising from the use of a bus type of communication system. One such advantage is the capability for communication over a common circuit among multiple signal sources and sinks. Another advantage lies in the flexibility which is available for adding equipment to the system. However, certain risks are involved in communicating via a bus system, and these require appropriate precautionary steps. For example, it is necessary in bus communications to isolate each of the communicating stations from spurious signal effects generated by other units coupled to the bus system or adjacent to the bus system. It is also advisable to minimize the effect of each of the communicating stations on the transmission characteristics of the bus circuit so that signals transmitted along the bus will produce substantially the same results at each station which is to receive those signals. It is further necessary to avoid undue disturbance of the bus communication function which might be caused by the failure of one or more stations that are coupled to the bus.

One known technique for coupling communicating stations to a bus circuit involves transformer coupling. This type of coupling can be designed to cope with the aforementioned risks, and one transformer coupling arrangement for bus systems is considered by J. B. Connell, L. W. Hussey, and R. W. Ketchledge in "No. 1 ESS Bus System" sections 3.3 and 3.4, pages 2044 through 2047, volume XLIII, No. 5, part 1, September 1964, Bell System Technical Journal. However, transformer coupling has certain limitations which are well known in the art. Thus, in order to achieve isolation through the transformer from the effects of equipment failure at a station, it is desirable to employ a high ratio of secondary to primary turns for coupling to receiving stations. Such ratio necessarily requires a large drive signal on the communication circuit bus for any information signals which are to be coupled to a station. It is, therefore, necessary to require fairly substantial power supply capabilities. In addition, the frequency handling capabilities of transformers are limited as is well known in the art, and such limitation will become a problem of increasing severity as operating rates of communication systems increase. Transformer coupling also is raising increasing problems from a manufacturing standpoint because it is inconvenient to incorporate transformers in the integrated format of circuit elements which presently holds great promise for the future.

It is, therefore, one object of the invention to facilitate the coupling of signals among plural communication stations.

It is another object to eliminate the need for transformer coupling of plural communication stations to a common communication circuit.

A further object is to increase the operating speed capabilities of common communication circuits.

Still further objects are to reduce the power requirements and facilitate the manufacture of common communication circuit systems.

STATEMENT OF THE INVENTION

The aforementioned objects are realized in one illustrative embodiment in which a transmitting circuit in one station which is coupled to a common communicating circuit completes a current path across a common current source through the communication circuit for drawing current from the source in accordance with information to be transmitted on the communication circuit. Photoemissive devices in the communication circuit at each receiving station coupled thereto respond to the current flow therethrough for providing photon coupling to their respective stations in accordance with the information content of signals from the transmitting station.

It is one feature of the invention that the aforementioned photon coupling is employed in either balanced or unbalanced communication circuits.

It is another feature that circuit devices for providing photon coupling are relatively easily manufactured in integrated circuit systems.

A further feature is that the upper frequency limit of operation of photon coupling arrangement lies, in the present state of the art, in the rise and fall times of the response of photon coupling devices; and such response times are considerably shorter than the response times of inductive coupling arrangements.

Still another feature is that the sensitivity to environmental noise of a communication circuit employing photon coupling decreases as the number of communicating units coupled to the circuit increases.

DESCRIPTION OF THE DRAWING

A complete understanding of the invention and its various features, objects and advantages may be obtained from a consideration of the following detailed description when taken in connection with the appended claims and the attached drawing in which:

FIG. 4A is a block and line diagram of one aspect of the system of FIG. 4;

FIG. 5 is a schematic diagram of one form of current limiting element that is useful in conjunction with the invention;

FIG. 6 is a simplified schematic diagram of another unbalanced system in accordance with the invention; and FIG. 7 is a simplified partial schematic diagram of another balanced system in accordance with the invention.

DETAILED DESCRIPTION

Figure 1:
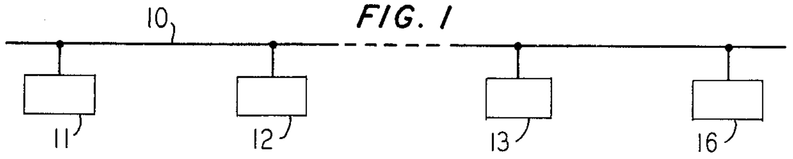
FIG. 1 is a simplified block and line diagram of a common communication circuit for providing communication among a plurality of stations.

In FIG. 1 a common communication circuit, or bus, 10 is provided as a communication medium among a plurality of stations 11, 12, 13 and 16. Only four stations are illustrated, but more are advantageously employed as schematically represented by broken lines in circuit 10 in the various figures. The bus 10 as considered herein represents a two-conductor communication path in which the conductors may be either open ended or looped. Each of the stations preferably includes either one or both of signal transmitting and signal receiving capabilities and also includes corresponding circuits for coupling the station to the bus 10. However, it will be apparent that any convenient combination of transmitting and receiving capabilities among the communicating stations may be employed. For convenience in describing the invention, the station 12 is herein arbitrarily considered to be the transmitting station and stations 11, 13, and 16 are arbitrarily considered to be the receiving stations.

Figure 2:
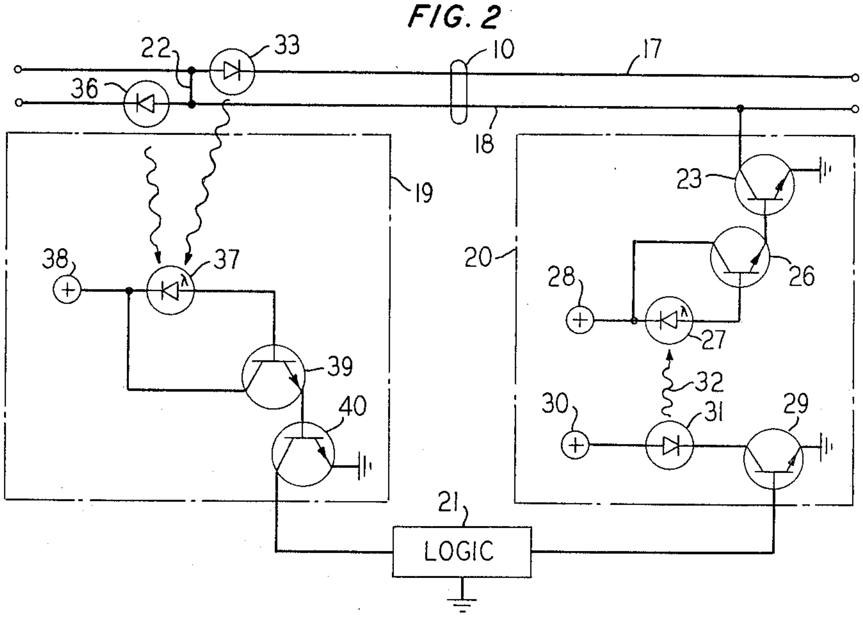
FIG. 2 is a schematic diagram of coupling arrangements employing the present invention in a communication station in an unbalanced system of the type shown in FIG. 1.

The schematic diagram of FIG. 2 represents both transmitting and receiving coupling arrangements for any one of the stations depicted in FIG. 1. The coupling arrangements are here described for an unbalanced communication circuit 10 which includes a first conductor 17 and a second conductor 18. The station depicted in FIG. 2 includes a signal receiving coupling circuit 19 and a signal transmitting coupling circuit 20 for providing signal coupling between the circuit 10 and the remaining apparatus of the station. Such remaining apparatus is schematically represented by a logic block 21 in FIG. 2 and includes circuitry which is appropriate to any of the station functions which are known in the art. For example, the station depicted in FIG. 2 could be a data set including circuits for transmitting and receiving data to various stations coupled to the communication circuit 10. By way of further example, one station could advantageously be a central control in a data processing system, and other ones of the communicating stations would be a plurality of stores associated with the central control through the communication circuit 10. Obviously in systems wherein bit-parallel operations are involved, a separate circuit 10 would be provided for each bit position accommodated in the bit-parallel system.

In the station depicted in FIG. 2, the conductors 17 and 18 are connected directly to each other by a wire 22. The latter wire is further connected through the conductor 18 to a collector electrode of a transistor 23 in transmitting circuit 20. The emitter electrode of transistor 23 is connected to ground and the transistor operates as the output stage of an amplifier for controlling the impedance to ground from the circuit 10 in accordance with the dictates of signals supplied by logic 21. For convenience in describing the invention, it will be set forth in terms of a digital system wherein the aforementioned signals actuate transistor 23 between cutoff and saturated conduction so that it functions in a switching mode. However, the invention is also applicable to arrangements in which logic 21 operates transistor 23 in an analog mode wherein the transistor functions continuously in its linear range of operation.

The input stage of the aforementioned amplifier is a transistor 26 which has its emitter electrode connected to the base electrode of the transistor 23. A photoconductive diode 27 is connected across the collector-base junction of transistor 26. Photoconductive diodes are known in the art and, when reversely biased, they conduct in the reverse direction in response to incident light. The level of conduction is a function of the intensity of illumination. The reverse conduction arrangement is used because it operates faster than forward conduction arrangements, and it also has a higher conversion efficiency. The collector electrode of transistor 26 is connected to a source 28 of positive potential which is schematically represented by a circled plus sign. The latter representation indicates a source of direct potential having its positive terminal connected at the location of the circled plus sign and having its negative terminal connected to ground. Such a schematic representation is employed in various locations throughout the drawing.

Signals from logic 21 control the conductivity of a transistor 29 and cause it to draw pulses of current corresponding to such signals from a source 30 through a photoemissive diode 31. Each pulse in diode 31 causes the diode to produce electromagnetic radiation herein designated photon emission and schematically represented by a wavy arrow 32. The functioning of photoemissive diodes is known in the art and the intensity of photon emission is a function of the level of forward current conducted by the diode. The photon emission illuminates the photoconductive diode 27, and the resulting conduction in the latter diode constitutes the input signal to the amplifier including transistors 23 and 26. In the aforementioned digital mode of operation, each pulse from logic 21 causes a current pulse to flow through diode 31 thereby producing a light pulse which activates diode 27 for causing transistor 23 to ground the communication circuit 10. Circuit 10 is then enabled to draw current from a source, shown in FIG. 3, and thereby apply to the circuit 10 signal variations corresponding to the information signals from logic 21.

The receiving circuits 19 of the station depicted in FIG. 2 include two photoemissive diodes 33 and 36 which are connected in series in the conductors 17 and 18, respectively. Diodes 33 and 36 have like electrodes, in this case their respective anodes, connected to the wire 22. It will be shown subsequently in connection with FIG. 3 that current at any given point in the circuit 10 may flow either to the left or to the right, and in either case one of the diodes 33 or 36 will carry such current and produce photon emission corresponding to the magnitude of such current. The diodes 33 and 36 are arranged close to a photoconductive diode 37 so that emission from either of the diodes 33 or 36 strikes the diode 37 to activate it to its conductive condition. Diode 37 is arranged with a source 38 and two transistors 39 and 40 in an amplifier circuit which is essentially the same as the amplifier circuit previously mentioned for amplifying the signals from photoconductive diode 27 in transmitting circuit 20. The output of transistor 40 is applied to logic circuit 21 and comprises signals corresponding to those appearing in the communication circuit 10.

Thus, the station depicted in FIG. 2 has both transmitting and receiving capabilities which are realized without requiring capacitors or transformers in the coupling arrangements. Consequently, such arrangements are relatively easily incorporated in integrating circuit systems. It has been found that in the absence of the isolating turns ratio normally required in transformer systems, substantially lower signal current is required in the communication circuit 10 by nearly an order of magnitude. Some power is of course required to operate the amplifiers in the circuits 19 and 20 which include the photon coupling links. However, such additional power is relatively small compared to the reduction in signal power required on communication circuit 10. This latter fact is particularly evident in integrated circuit systems.

Figure 3:
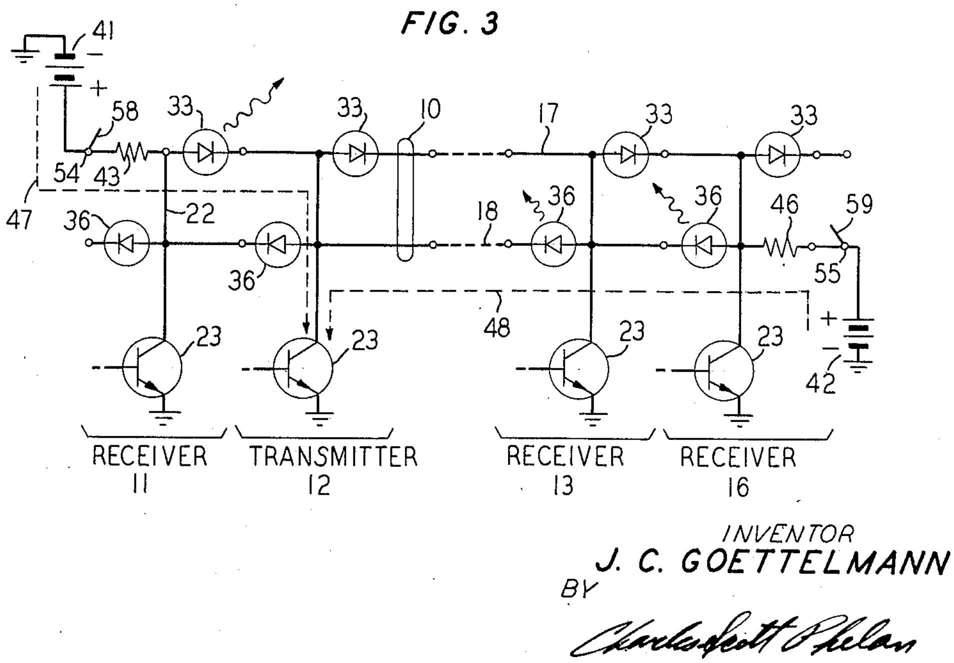
FIG. 3 is a simplified schematic diagram of an unbalanced system of the type shown in FIG. 1 and employing coupling arrangements as shown in FIG. 2.

FIG. 3 shows a simplified communication circuit system of the type shown in FIG. 1 and incorporating photon coupling in accordance with FIG. 2. A portion of all of the photoemissive diodes is connected in each of the conductors 17 and 18. Diodes 33 are in conductor 17 and diodes 36 in conductor 18. Diode 36 in station 11 and diode 33 in station 16 are not used as shown in FIG. 3 but they are left in the circuit to indicate the potential for growth by adding stations at either end of circuit 10. In this figure only the final transistor 23 of each station transmitting circuit 20 is shown and only the photoemissive diodes 33 and 36 of each station receiving circuit 19 are shown. In FIG. 3 the previously mentioned current source includes two batteries 41 and 42 which are connected through current limiting impedance elements 43 and 46, respectively, to conductors 17 and 18, respectively, of the communication circuit 10. Each of the batteries 41 and 42 has its positive terminal connected to circuit 10 through a current limiting element and its negative terminal connected to ground. Elements 43 and 46 may be simply resistors as shown in FIG. 3, or each may be the collector-emitter circuit of a transistor current regulating arrangement, many forms of which are known in the art. One such transistor regulating circuit is shown in FIG. 5 and will be subsequently described.

The elements 43 and 46 limit current in the conductors of communication circuit 10 to a level which will not damage any of the diodes or transistors. However, their impedance must be small enough to permit adequate current to flow in the circuit 10 to assure operation of the photoemissive diodes therein in the manner hereinbefore described. It is possible for the elements 43 and 46 to have an impedance that is large enough to cause the batteries to operate as a current source so that substantially constant current is supplied regardless of the number of photoemissive diodes which are loading a particular battery. However, in the latter mode of operation, some of the power-saving benefits of the invention are not realized.

Considering the operation of the overall embodiment of FIG. 3 the transistor 23 in the transmitting station 12 is activated to ground communication circuit 10 in the manner previously outlined in connection with FIG. 2. Current now flows from the left in a path indicated by a broken line arrow 47 from battery 41 through element 43, the photoemissive diode 33 in receiving station 11, and transistor 23 in transmitting station 12 to ground. Current also flows from the right to transistor 23 as indicated by another broken line arrow 48 from battery 42 through element 46 and the photoemissive diodes 36 in receiving stations 13 and 16. No current flows in either of the photoemissive diodes 33 and 36 of the transmitting station 12.

It can be seen from the arrangement in FIG. 3 that all of the diodes 33 in the various stations are poled for conduction to the right in conductor 17, and all of the diodes 36 are poled for conduction to the left in conductor 18. This arrangement, plus the wires 22 between conductors 17 and 18 in each of the stations, permit signal current to flow through a single photoemissive diode in each receiving station no matter which of the stations happens to be a transmitting station at any particular time.

The embodiment of the invention described in connection with FIGS. 2 and 3 has been set forth in terms of a pulsed system. The transmitting circuit transistors 23 are turned on and off at the information bit rate, and the photoconductive and photoemissive diodes are similarly operated at the same rate. Such diodes have a time constant of operation which is much lower than that which normally characterizes transformer coupling circuits. Consequently the described photon coupling arrangement operates at substantially higher information bit rates than do transformer coupled arrangements. In an arrangement which was actually operated, gallium arsenide photoemissive diodes were employed. Such diodes, as is known in the art, have rise and fall times of the order of one nanosecond; and they emit incoherent light in the near infrared region of the spectrum, i.e., with a wave length of approximately 0.9 micron. Such a diode has an active emitting area of approximately .02 inch diameter. Silicon photoconductive diodes were used in conjunction with the aforementioned photoemissive diodes and have rise and fall times less than one nanosecond. Such photoemissive and photoconductive devices were spaced less than .04 inch apart with an air interface. A 40 milliampere current pulse in the photoemissive diode produced a 40 microampere pulse from the photoconductive diode for a current transfer ratio $n$ of approximately $1\times10^{-3}$. Such photoemissive and photoconductive devices can be fabricated in batch quantities by techniques presently known in the art to produce silicon photoconductive diodes and amplifier transistors on a common silicon substrate. The gallium arsenide emitting diodes are then cemented or welded into etched holes in the substrate.

In the embodiment constructed, the communication circuit 10 was a fifteen foot twisted pair with the pairs of photoemissive diodes 33 and 36 for the respective stations spaced at three foot intervals along the twisted pair. A data bit period of 75 nanoseconds was easily attained. That period compares favorably with periods of 2 microseconds or more that are found in transformer coupled circuits. Using in the constructed embodiment the 40 milliampere drive pulse having a rise time of about five nanoseconds, pulse propagation time along the circuit 10 was about 1.5 to 2.0 nanoseconds per foot. In operations based on a duty cycle of approximately nine per cent, an average signal power in the circuit 10 of 3.3 milliwatts per station was required. This compares favorably with the power requirements of about 200 milliwatts per station in a typical corresponding transformer coupled arrangement.

It has been noted that the communication circuit in accordance with the invention has increased protection against noise interference as the number of stations coupled thereto increases. The reason for this characteristic is that as stations are added to the communication circuit 10 the number of diodes in series in that circuit increases and the amount of noise voltage that must be developed in the circuit in order to drive such diodes into conduction increases. Thus, a voltage which is of sufficient magnitude to drive all of the diodes in one of the conductors 17 or 18 into conduction would be required to cause spurious breakdown and photon emission, and such a voltage is not likely to occur. It is also unlikely that the diodes 33 and 36 in different adjacent stations would break down to permit conduction in a loop including the wires 22 of the two stations since their physical closeness would not permit a sufficiently large voltage to be induced. Furthermore, since such diodes are oppositely poled in different conductors of the longer communication circuit 10, a noise voltage in the area which may tend to drive one into conduction would also tend to drive the other into a nonconducting state.

Figure 4:
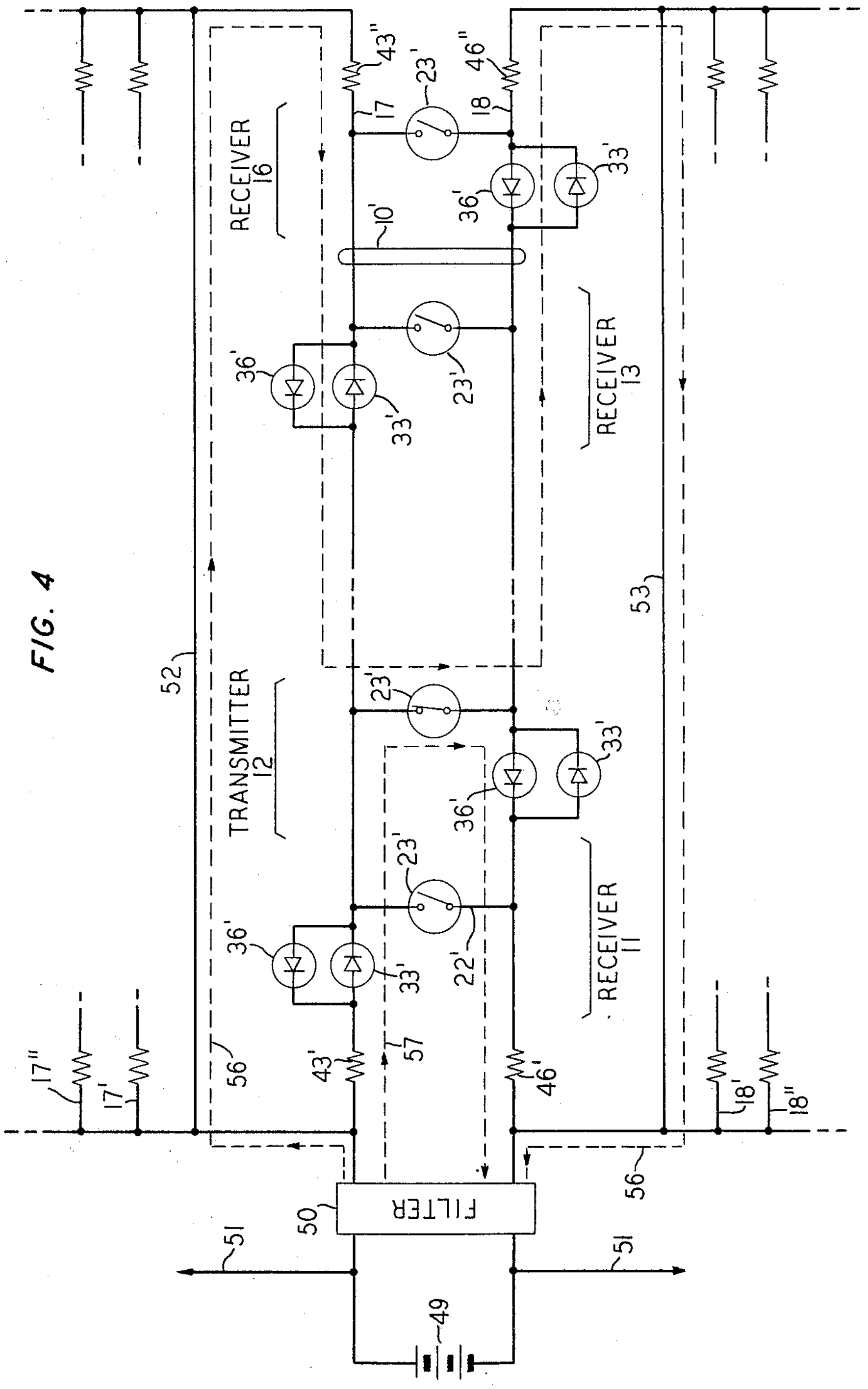
FIG. 4 is a simplified schematic diagram of a balanced communication system in accordance with the invention.

The question of noise interference also brings up one possible disadvantage of an unbalanced communication circuit of the type hereinbefore described. Such an unbalanced circuit tends to radiate electromagnetic energy and can, therefore, interfere with adjacent equipment if sensitive equipment is nearby. FIG. 4 shows how the principles of the present invention are advantageously applied to a balanced communication circuit to avoid that disadvantage.

In the simplified system diagram of FIG. 4 the station circuits are similar to those shown in FIG. 3. Transmitting circuit transistors 23 are in FIG. 4 schematically represented by switches 23'. The conductors 17 and 18 in FIG. 4 are now included in a balanced circuit 10'. The final stage transistor in the transmitting circuit 20 of each station is in FIG. 4 connected between the conductors 17 and 18 in series in the wire 22' of such station. A portion of all of the photoemissive diodes is connected in each of the conductors 17 and 18. Thus, in the receiving circuit of each station the photoemissive diodes 33′ and 36′ are connected in a parallel circuit combination in oppositely poled senses with such combination being connected in series in one of the conductors 17 or 18. Diodes of adjacent stations are in different conductors. The transmitting and receiving circuits of the respective stations operate otherwise in the same manner hereinbefore described in connection with FIGS. 2 and 3.

In FIGURE 4 a single battery 49 and an associated noise suppressing filter 50 comprise the current source for the communication circuit 10′. In certain applications of such a communication circuit, the current source is advantageously employed for supplying current to other equipment in the system; and such equipment is schematically represented in FIG. 4 by the leads 51. However, the operation of such additional equipment sometimes affects the output of the battery 49; and filter 50 is designed in a manner known in the art to suppress the resulting noise so that it does not significantly influence the communication circuit 10′ and the stations coupled thereto.

Each of the conductors 17 and 18 is looped around on itself by a shunting bus connected between the end points thereof. Thus, in FIG. 4 a positive power bus 52 is connected between the end points of conductor 17, and a negative power bus 53 is connected between the end points of conductor 18. The conductors 17 and 18 are connected through filter 50 to the terminals of battery 49. Current magnitude control is accomplished in FIG. 4 in essentially the same manner previously described in connection with FIG. 3 except that in FIG. 4 the nature of operation of the balanced communication circuit 10′ requires that each end of each conductor have a current regulating element as indicated by elements 43′, 43″, 46′ and 46″. The photoemissive diodes of receiving circuits for adjacent stations along the communication station 10′ are staggered so that adjacent stations have their diodes connected in different ones of the conductors 17 and 18. This arrangement assures a substantially balanced state in the communication circuit regardless of which of the stations coupled thereto happens to be a transmitting station at any given time.

In the operation of the embodiment of FIG. 4, the transmitting circuit transistor 23′ is switched closed in the transmitting station 12 to shunt circuit 10′. This action connects the conductors 17 and 18 together and establishes two conduction paths for current from the battery 49. A first path extends as indicated by an arrow 56 from filter 50 through the positive power bus 52, the photoemissive diode 36′ of receiving station 13, switch transistor 23′ in transmitting station 12, photoemissive diode 33′ in receiving station 16, negative power bus 53, and back to filter 50. The second current path extends from filter 50 through the photoemissive diode 33′ of receiving station 11, transmitting switch transistor 23′ of station 12, the photoemissive diode 36′ of transmitting station 12 and back to filter 50. Within each pair of photoemissive diodes only one diode conducts as dictated by the polarity of current applied to each parallel-connected diode pair.

One further change is required for operation of the embodiment of FIG. 4, although not shown therein; and that is to provide in the transmitting station 12 a circuit which is responsive to the operation of transistor 23′ for disabling either the receiving circuit 19 of that station or the portion of logic circuit 21 controlled thereby. A circuit 24 for this purpose is shown in FIG. 4A and inhibits the receiving part of logic 21′ when transmitting circuit 20 is actuated. The need for this inhibiting function arises from the aforementioned fact that current in the communication circuit 10′ in its balanced embodiment shown in FIG. 4 flows in a photoemissive diode in the transmitting station. Consequently the receiving circuits of that station must be inhibited to avoid erroneous operation thereof.

In a system wherein bit parallel operations are performed, the communication circuit 10′, or its corresponding circuit 10, would comprise circuitry for only a single bit position of the system. However, other bit position circuits would be similarly provided and served by the same communication circuit current source. This is represented schematically in FIG. 4 by the partially indicated additional communication circuit conductors 17′, 17″ and 18′, 18″. Such additional communication circuits also utilize in common the positive and negative power buses 52 and 53. The availability of the common current source to serve other communication circuits is also indicated in FIG. 3 by the short diagonal lines 58 and 59 at branching terminals 54 and 55 on the conductors 17 and 18, respectively. However, when other circuits are served in FIG. 3 an appropriate noise filter, not there shown, is also advantageously employed similarly to the manner illustrated for filter 50 in FIG. 4.

FIG. 5 shows a high speed current regulator, or limiting, circuit that is advantageously employed for the current limiting elements 43, 46, 43′, 46′, 43″ and 46″. This circuit is interposed as a four-terminal network to replace resistive elements shown in the drawing. One regulator is substituted for resistor 43 in FIG. 3 by connecting input terminals 60 and 61 to the branching terminal 54 and the negative terminal of battery 41, respectively. Output terminals 62 and 63 in FIG. 5 are connected to the collector electrode of transistor 23 in receiving station 11 of FIG. 3 and to the negative terminal of battery 41, respectively. A duplicate regulator is similarly substituted for element 46 in FIG. 3. In each case current from the corresponding battery of FIG. 3 flows in resistors 66 and 67 of FIG. 5 to hold a reverse breakdown diode 68 in reverse conduction and thereby establish a forward bias on the base-emitter junction of a transistor 69. Transistor 69 normally operates in saturated conduction. Battery current flows in the collector-emitter path of the transistor and through resistors 70 and 71 to the circuit 10, and the current returns by way of ground.

If current level in the regulator circuit exceeds a predetermined value, the drop across resistor 70 reduces the net base-emitter bias on transistor 69 sufficiently to drop the transistor into its linear conduction range. In that range any tendency of emitter current to increase is checked by a corresponding reduction in base-emitter junction bias. Other circuit elements associated with circuit 10 are thereby protected from excessive current. The resistor 71 pads out the resistance of the limiting circuit as seen from terminals 62 and 63 to match the impedance of the circuit 10.

When limiting circuits as in FIG. 5 are used in the balanced system of FIG. 4, each limiting circuit replaces one of the pairs of limiting elements 43′–46′ and 43″–46″. In the balanced configuration the resistance of resistor 71 is divided into two parts connected, respectively, to output terminals 62 and 63.

The communication circuit 10′ is a transmission line, and the series-connected photoemissive diodes represent discontinuities that can produce in some applications thereof objectionable signal reflections. Such reflections are avoided by adding resistance to the circuit so that the characteristic impedance is always seen in circuit 10′ regardless of which station is transmitting. This change is shown in the embodiment of FIG. 6 which is a modified unbalanced format that is advantageously employed in a coaxial line. The embodiment of FIG. 6 bears some similarity to the balanced circuit of FIG. 4, and the matching resistors can also be employed in the latter embodiment.

In FIG. 6 resistors 71 are in series with the battery 41′ and with the collector electrode of each of the transmitting circuit transistors 23. Each resistor 71 has resistance of the desired characteristic resistance of the communication circuit 10″. Photoemissive diodes 33 and 36 at each station are connected in parallel with one another as was done in FIG. 4, but in FIG. 6 all of the parallel-connected diode pairs are in series in conductor 17.

Current limiting elements 43 and 46 are both in series in conductor 17. A positive power bus 52', similar to that used in FIG. 4, is employed in FIG. 6 to interconnect the ends of conductor 17. However, since all photoemissive diodes of receiving circuits are in conductor 17, the conductor 18 performs the function of a negative power bus. Otherwise the circuit of FIG. 6 performs similarly to the other embodiments to permit one transmitting circuit to activate the receiving circuits of all other stations. Since its own receiving circuit is also activated, the inhibiting arrangement of FIG. 4A is also employed with FIG. 6.

Filter 50' in FIG. 6 performs the same function previously described for filter 50 in FIG. 4, but the filter 50' is of course adapted for the unbalanced circuit format in which it is used. The circuit of FIG. 5 in its unbalanced format is also useful in the system of FIG. 6. Only two stations are shown in FIG. 6 but others are added in similar fashion.

It can be observed in the FIG. 4 balanced embodiment that if, counting from one end of circuit 10, an odd numbered station is transmitting either of the current paths established thereby in circuit 10 includes unequal numbers of diodes in conductors 17 and 18. In some applications this could constitute a sufficient electrical unbalance to produce undesirable radiations. FIG. 7 shows a further modification of the balanced circuit to avoid the mentioned difficulty.

FIG. 7 is a partial schematic diagram of a balanced system of the type shown in FIG. 4. Resistors 71 have been added as previously discussed, but otherwise the omitted source, filter, and circuit branching are as in FIG. 4. Only two of the stations are shown since no more are needed to understand the nature of the further change in the circuit.

In FIG. 7 adjacent stations are paired so that the left-hand station in each pair has its photoemitting diodes in conductor 17 and to the left of the connection of resistor 71 to that conductor. The right-hand station in each pair has its photoemitting diodes in conductor 18 and to the right of the connection of the emitter electrode of the transistor 23 in the station. Two sets 72 and 73 of dummy diodes, each set being the same as the sets of diodes 33 and 36 in each station, are added to circuit 10. The set 72 is at the right-hand end of conductor 17 next to the element 43'', and the set 73 is at the left-hand end of conductor 18 next to element 46'. Now no matter which station along circuit 10 is the transmitting station either of the current paths established thereby in circuit 10 includes equal numbers of diodes in conductors 17 and 18 and the circuit is balanced.

Although the present invention has been described in connection with particular embodiments thereof, it is to be understood that additional embodiments and applications of the invention are obvious to those skilled in the art are included within the spirit and scope of the invention.

What is claimed is:

1. In combination at least one two-conductor circuit for providing communication of signals among a plurality of stations, separate photoemissive devices in each of said two conductors at each of said stations for emitting light in response to the flow of electric current therethrough, said devices connected in series in each of said conductors, a course of current, and means in at least one of said stations operable by signal conditions at such station for completing a circuit path including said circuit across said source for drawing current from said source through said photoemissive devices in other ones of said stations whereby photoemission from each such photoemissive device corresponds to the information content of said signals.

2. The combination in accordance with claim 1 in which said photoemissive devices are diodes.

3. The combination in accordance with claim 1 in which said circuit completing means comprises a connection between said conductors, and switching means operable to complete an electric current path through such connection across said current source.

4. The combination in accordance with claim 3 in which said photoemissive devices are diodes, and at each of said stations two such diodes are connected respectively in said two conductors with like electrodes connected to said connection between conductors.

5. The combination in accordance with claim 1 in which each of said stations includes means responsive to photon emission from said photoemissive devices, said responsive means comprising a photoconductive diode receiving said photon emission, a first transistor having the base and collector electrodes thereof connected across said photoconductive diode to be forward biased in response to photon responsive conduction in said diode, and a second transistor having a base electrode connected to an emitter electrode of said first transistor and having its collector and emitter electrodes coupled for controlling such station in response to said signals.

6. The combination in accordance with claim 4 in which said current source comprises first and second batteries having first terminals of like polarity connected to opposite ends of said two conductors, respectively, of said communications circuit.

7. The combination in accordance with claim 1 in which said source is a battery connected between corresponding first end points of said two conductors, a first circuit shunts a first one of said two conductors of said communication circuit by connecting said first end point thereof to a second end point thereof.

8. The combination in accordance with claim 7 in which said photoemissive devices at each of said stations incuides two parallel connected but oppositely poled diodes in series in one of said two conductors.

9. The combination in accordance with claim 7 in which said circuit completing means at each of said stations comprises switching means connected between said two conductors of said communication circuit.

10. The combination in accordance with claim 1 in which impedance means establish current from said source in a range corresponding to a range of photoemissive characteristics of said photoemissive devices.

11. The combination in accordance with claim 10 in which said impedance means comprises current-limiting resistor means.

12. The combination in accordance with claim 10 in which said impedance means comprises a transistor having a collector-emitter circuit thereof connected in series with said source, means biasing a base-emitter circuit of said transistor for operating said transistor in saturation for a predetermined range of current levels from said source, and means degeneratively biasing said base-emitter circuit of said transistor for operating said transistor in a linear operating range in response to source current levels in excess of said range.

13. The combination in accordance with claim 7 which comprises in addition filter means connected across the output of said battery for suppressing the transmission of noise signals in said current source to said communication circuit.

14. The combination in accordance with claim 7 which comprises in addition a plurality of resistors all of substantially the same predetermined resistance, said resistance being substantially the characteristic resistance of said communication circuit, and means connecting different ones of said resistors between said two conductors in series with said source and with said circuit completing means at different ones of said stations, respectively.

15. The combination in accordance with claim 7 in which said two conductors comprise a balance circuit, a second circuit shunts a second conductor of said communication circuit by connecting said first end point thereof to a second end point thereof, and said photoemissive devices at adjacent ones of said stations along said communication circuit are in different ones of said two conductors, respectively.

16. The combination in accordance with claim 15 in which the stations in adjacent pairs of said stations along said communication circuit have their respective photoemissive devices on the same circuit side of their respective circuit completing means.

17. The combination in accordance with claim 16 in which the stations in adjacent pairs of said stations along said communication circuit have their respective photoemissive devices on opposite circuit sides of their respective circuit completing means, and first and second dummy photoemissive devices are connected respectively in series in said first and second conductors at opposite ends of said communication circuit.

18. The combination in accordance with claim 7 in which said two conductors comprise an unbalanced circuit, and all of said photoemissive devices are connected in a single one of said two conductors.

19. The combination in accordance with claim 1 in which each of said stations includes station operating logic establishing said signal conditions, photoemissive means coupled to an output of said logic, and photoconductive means in said circuit completing means and arranged to be illuminated by said photoemissive means.

References Cited

UNITED STATES PATENTS

| | | | |
|---|---|---|---|
| 2,716,729 | 8/1955 | Shockley | 323—7 |
| 3,215,845 | 11/1965 | Solomon et al. | 250—209 |
| 3,226,553 | 12/1965 | Terlet | 250—209 |
| 3,235,860 | 2/1966 | Vassil | 307—311 X |
| 3,304,430 | 2/1967 | Biard et al. | |
| 3,315,176 | 4/1967 | Biard. | |

RALPH G. NILSON, Primary Examiner

C. M. LEEDOM, Assistant Examiner

U.S. Cl. X.R.

250—217; 307—117, 311; 323—7

PO-1050
(5/69)

UNITED STATES PATENT OFFICE
CERTIFICATE OF CORRECTION

Patent No. 3,492,488 Dated January 27, 1970

Inventor(s) John C. Goettelmann

It is certified that error appears in the above-identified patent and that said Letters Patent are hereby corrected as shown below:

Column 9, line 69, change "course" to --source--.

Column 11, line 21, change "balance" to --balanced--;

line 34, change "16" to --15--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents